United States Patent
Baize et al.

(10) Patent No.: US 11,790,152 B2
(45) Date of Patent: Oct. 17, 2023

(54) PRESENTING WEB CONTENT BASED ON RULES

(71) Applicant: OpenFin Inc., New York, NY (US)

(72) Inventors: Pierre Baize, Cottonwood Heights, UT (US); Ricardo de Pena, Lakeland, FL (US); Chuck Doerr, New York, NY (US)

(73) Assignee: OpenFin Inc., New York, NY (US)

( * ) Notice: Subject to any disclaimer, the term of this patent is extended or adjusted under 35 U.S.C. 154(b) by 0 days.

(21) Appl. No.: 17/518,203

(22) Filed: Nov. 3, 2021

(65) Prior Publication Data

US 2022/0138401 A1 May 5, 2022

Related U.S. Application Data (60) Provisional application No. 63/110,267, filed on Nov. 5, 2020.

(51) Int. Cl.
| | |
|---|---|
| *G06F 40/10* | (2020.01) |
| *G06F 40/106* | (2020.01) |
| *G06F 40/14* | (2020.01) |
| *G06F 16/957* | (2019.01) |
| *G06F 16/958* | (2019.01) |

(52) U.S. Cl.
CPC .......... *G06F 40/106* (2020.01); *G06F 16/957* (2019.01); *G06F 16/958* (2019.01); *G06F 40/14* (2020.01)

(58) Field of Classification Search
None
See application file for complete search history.

(56) References Cited

U.S. PATENT DOCUMENTS

| | | | |
|---|---|---|---|
| 9,003,277 B2* | 4/2015 | Wan | G06F 16/9577 |
| | | | 715/234 |
| 9,448,985 B2* | 9/2016 | Arutyunyan | G06F 3/0483 |
| 9,483,570 B2* | 11/2016 | Connan | G06F 16/957 |
| 9,632,758 B2* | 4/2017 | Holt | G06Q 30/02 |
| 9,658,747 B2* | 5/2017 | Rossi | G06F 3/0483 |
| 10,423,691 B1* | 9/2019 | Patel | G06F 16/9566 |

(Continued)

OTHER PUBLICATIONS

N. Lwin, "Agent Based Web Browser," 2009 Fifth International Conference on Autonomic and Autonomous Systems, 2009, pp. 106-110.*

(Continued)

*Primary Examiner* — Maikhanh Nguyen
(74) *Attorney, Agent, or Firm* — Womble Bond Dickinson (US) LLP

(57) ABSTRACT

A method of presenting content is provided. The method includes receiving a request to access first content. The request is received via a first browser. The request includes a first uniform resource identifier. The method also includes obtaining a set of rules. The set of rules indicate how the first content is presented. The method further includes determining whether the request to access the first content satisfies one or more rules of the set of rules based on the first uniform resource identifier. The method further includes presenting the first content based on the one or more rules in response to determining that the request to access the first content satisfies the one or more rules.

17 Claims, 7 Drawing Sheets

(56) References Cited

U.S. PATENT DOCUMENTS

| | | | |
|---|---|---|---|
| 2007/0101061 A1* | 5/2007 | Baskaran | H04L 67/568 711/118 |
| 2011/0126113 A1* | 5/2011 | Sharma | G06F 16/9577 715/738 |
| 2011/0196821 A1* | 8/2011 | Hellerman | G06F 16/958 707/E17.014 |
| 2011/0202828 A1* | 8/2011 | Wan | G06F 16/9577 715/234 |
| 2012/0173607 A1 | 7/2012 | Connan et al. | |
| 2013/0080874 A1 | 3/2013 | Coleman et al. | |

OTHER PUBLICATIONS

International Search Report and Written Opinion dated Mar. 3, 2022 for International Application No. PCT/US2021/057984.

\* cited by examiner

```
1   const contentCreationOptions = {
2     rules: [
3       {
4         behavior: 'window',
5         match: [
6           '*://*.website1.com/customer/account/*'
7         ],
8         options: {
9           'frame': false,
10          'alwaysOnTop': true,
11          'defaultWidth': 800,
12          'defaultHeight': 600
13        }
14      },
15      {
16        behavior: 'browser',
17        match: [
18          '*://*.website2.com/*'
19        ]
20      },
21      {
22        behavior: 'view',
23        match: [
24          '*://*.website3.com/r/javascript'
25        ],
26        options: {
27          'title': '...loading'
28        }
29      },
30      {
31        behavior: 'block',
32        match: [
33          '*://*.website4.com/sales/*'
34        ]
35      },
36      {
37        behavior: 'window',
38        match: [
39          '*://*/*?window=true'
40        ]
41      },
42      {
43        behavior: 'view',
44        match: [
45          '<all_urls>'
46        ]
47      }
48    ]
49  }
```

205 — lines 3–14
210 — lines 15–20
215 — lines 21–29
220 — lines 30–35
225 — lines 36–41
230 — lines 42–47

PRESENTING WEB CONTENT BASED ON RULES

CROSS-REFERENCE TO RELATED APPLICATIONS

This application claims the benefit under 35 U.S.C. § 119(e) of U.S. Provisional Application Ser. No. 63/110,267, filed Nov. 5, 2020, the disclosure of which is incorporated herein by reference in its entirety.

BACKGROUND

Users will often view, listen to, or consume content via computing/client devices, such as smartphones, tablet computers, laptop computers, desktop computers, etc. One type of content that may be consumed by users may be web content. Web content may be textual, visual, and/or aural content that may be included/published on a website or network location. The content may be accessed using a resource identifier, such as a uniform resource identifier (URI), a uniform resource locator (URL), etc. Web content may be viewed and/or access using a browser (e.g., a web browser). For example, the browser may display content (e.g., web content) in an existing browser window, a new browser window, or a new browser tab.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

As discussed above, users may consume content, such as web content, using browsers. The content may be accessed using a URI, URL, etc. The browser may display content (e.g., web content) in an existing browser window, a new browser window, or a new browser tab. An organization/entity (e.g., a company, a corporation) or a user (e.g., a network administrator, a developer, etc.) may want to control the content that is consumed by users. For example, a user/entity may want to control which content can be consumed (e.g., which content is presented/displayed by a browser). In another example, the user/entity may want to control how the content is displayed (e.g., whether the content should be displayed in a new window or tab).

The present disclosure is directed to systems and methods that provide for content to be displayed or presented according to rules (e.g., content creation or content display rules). In one embodiment, developers for an entity may choose to display content from distinct locations (e.g., external to the platform). The content may be distributed/published by the entity or may be distributed/published by external entities (e.g., other companies or users).

The rules, as described herein, allow a user (e.g., a developer, an administrator) to define parameters on what that content can do when it presents or displays additional content, or how the content and/or additional content should be presented. When a browser (e.g., a rule engine or rule module of the browser) uses the rules to display/present content, this allows the developer to more easily integrate third-party content. For example, the rules may allow a user to more quickly and/or more easily define which content is allowable and how that content should be displayed. The rules may also allow the user to ensure that the end user (who is consuming, viewing, etc., the content) has a standard user interface (UI) or user experience (UX) globally regardless of where the content originates from.

In addition, the rules and the browser (e.g., the rule engine or component that uses the rules to present/display content) may allow a user (e.g., a developer, administrator, etc.) to modify the behavior of content without modifying the content itself. For example, the rules allow the user to modify how the content should be presented (e.g., via a new tab rather than a pop-up window), but does may not change the text, video, audio, etc., of the content.

Figure 1:
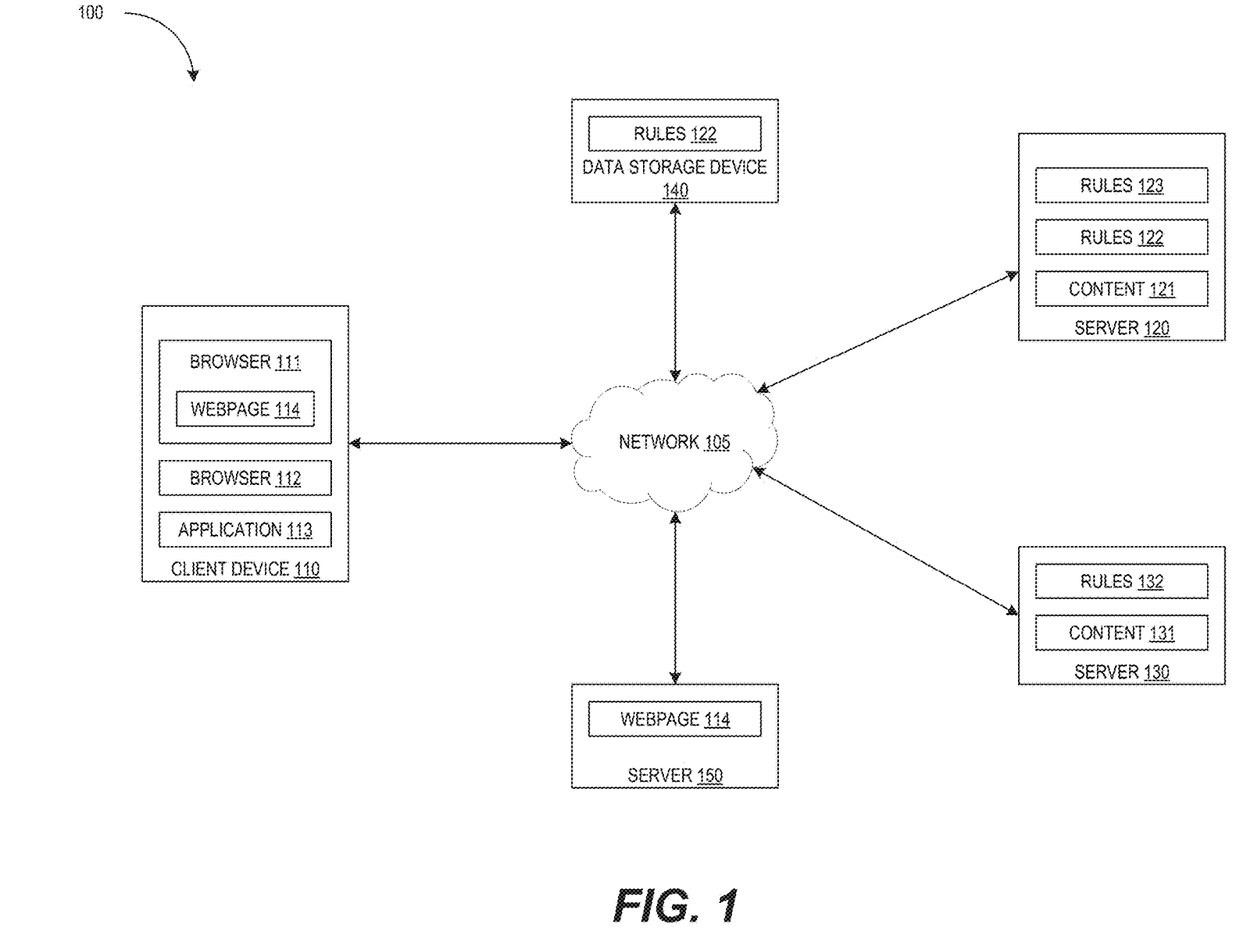
FIG. 1 is a block diagram that illustrates an example of a content delivery system, in accordance with some embodiments of the present disclosure.

FIG. 1 is a block diagram that illustrates an example of a content delivery system 100, in accordance with some embodiments of the present disclosure. The content delivery system 100 may include a client device 110, server 120, server 130, data storage device 140, and server 150. For simplicity, only one client device 110 is illustrated, however, there may be more or less implemented in other embodiments of the content delivery system 100. Network 105 may be a public network (e.g., the internet), a private network (e.g., a local area network (LAN) or wide area network (WAN)), or a combination thereof. In various embodiments, the network 105 may include a wired or a wireless infrastructure, such as a WiFi™ hotspot connected with the network 105, and/or a wireless carrier system that can be implemented using various data processing equipment, communication towers (e.g. cell towers), etc. In embodiments, the network 105 may utilize any protocol or combination of protocols for communicating data between the client device 110, servers 120, 130, and 150, and data storage device 140, such as Ethernet, internet protocol (IP), etc. The content delivery system 100 may be a cloud-based service, on an organization's network, a stand-alone on a desktop, or at any other location connectable to one or more client devices, such as client device 110.

The client device 110 may include hardware such as a processing device, memory, and other hardware devices (e.g., sound card, video card, etc.) (not shown). Similarly, each of the servers 120, 130, and 140, and data storage device 140 may include hardware such as processing devices, and respective memories, and other respective hardware devices (e.g., sound card, video card, etc.) (not shown). The processing devices, and the memories may be any one or combination of processing devices and memories discussed below with respect to FIG. 7. In an illustrative example, processing devices may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices may also include one or more special-purpose processing devices such as an application specific integrated circuit (ASIC), a field programmable gate array (FPGA), a digital signal processor (DSP), network processor, or the like.

Each of client device 110, server 120, server 130, and server 150 may include any suitable type of computing device or machine that has one or more processing devices including, for example, server computers, desktop computers, laptop computers, tablet computers, smartphones, set-top boxes, etc. In some examples, a computing device may comprise a single machine, virtual machines running on one or more machines, or may include multiple interconnected real or virtual machines (e.g., multiple nodes in a cluster). The computing device 110, server 120, server 130 and server 150 may be implemented by a common entity or may be implemented by different entities. For example, client device 110 and server 150 may be operated by a first entity, server 120 may be operated by a second entity, and server 130 may be operated by a third entity.

In one embodiment, the browser 111 (e.g., a first browser) may receive a request to access content 121 (e.g., a first content, web content, etc.). For example, a user may provide user input clicking, selecting, activating, etc., a button, link, that is in the webpage 114 or that is presented, displayed, provided, etc., by the browser 111. Although webpage 114 is illustrated in FIG. 1, other types of user interfaces (e.g., other types of graphical user interfaces) and other types of web content may be used in other embodiments. The request may include a uniform resource identifier (URI). A uniform resource identifier may be a sequence of characters that may identify a logical/physical resource or a location where content (e.g., web content) may be accessed. For example, the request may include a uniform resource locator (e.g., a URL, a webpage address, etc.).

In one embodiment, the browser 111 may obtain a set of rules 122 for the content 121. The set of rules 122 may indicate how the content 121 should be presented, displayed, shown, etc., by the browser 111. For example, the set of rules 122 may indicate whether the content 121 should be displayed in a new browser window, as discussed in more detail below.

In one embodiment, the browser 111 may request the set of rules 122 when the browser 111 receives the request for the content 121. For example, the browser 111 may determine that the content 121 is stored on server 120, based on the URI in the request for the content 121. The browser 111 transmit a request for the rules 122 to the server 120 and may receive the rules 122 from the server 120.

In one embodiment, the browser 111 may obtain the rules 122 (or 132) from a storage device 140. For example, the storage device 140 may be a repository, database, data store, etc., where rules (e.g., rules 122, rules 132, etc.) for different content (e.g., different web content, different webpages, different web-based content, etc.) are stored.

In one embodiment, the browser 111 may retrieve the rules 122 from the storage device 140 prior to receiving the request to access the content 121. For example, the browser 111 may retrieve and store the rules 122 first, so that the rules 122 are readily available when a request to access the content 121 is received. In another embodiment, the browser 111 may retrieve the rules 122 from the storage device 140 when the request to access the content 121 is received.

In one embodiment, the browser 111 may determine whether the request to access the content 121 satisfies, matches, etc., one or more of the rules 122. For example, the browser 111 may compare portions of the URI (or the whole URI) of content 121 (e.g., the URI in the request to access the content 121) with the resource identifiers (e.g., URIs) in the rules 122. The browser 111 may determine whether any portions of the URI (or the whole URI) of content 121 match any of the resource identifiers in the rules 122.

As discussed above, the URI of the content 121 may match, satisfy, etc., one or more of the rules 122. When multiple rules 122 are matched/satisfied, the browser 111 may select one or more of the multiple rules 122. For example, the browser 111 may select/use the first rule that is matched/satisfied. In another example, the browser 111 may select/use all of the rules that are matched/satisfied. In a further example, the browser 111 may select rules 122 that do not conflict with each other (e.g., rules 122 that have actions which do not conflict with each other).

In one embodiment, the browser 111 may present, display, the content 121 in response to determining that the URI of the content 121 satisfies/matches one or more of the rules 122. For example, the browser 111 may display the content 121 in the browser 111 based on one or more of the rules 122. Various different actions, operations, methods, etc., may be performed by the browser 111 to present/display the content 121 based on the rules 122, as discussed in more detail below.

In one embodiment, the request to access the content 121 may be received via webpage 114, which is presented, displayed, etc., by the browser 111. The webpage 114 may be stored, hosted, published, etc., by the server 130. The webpage 114 may include a link, a URL, etc., to the content 121. The user may active, select, click, etc., the link/URL to access the content 121.

As discussed above, the browser 111 may present, display, etc., content 121 based on one or more rules 122 that matched, satisfied, etc., by the URI of the content 121. A rule 122 may include one or more actions that may be used to present or display the content 121. The browser 111 may display or present the content 121 based on the one or more actions. For example, the browser 111 may present the content 111 using the browser 112 (e.g., another browser, a second browser, etc.), based on one or more of the rules 122. In another example, the browser 111 may instantiate, create, etc., a new browser window and may present the content 111 in the new browser window, based on one or more of the rules 122. In a further example, the browser 111 may instantiate, create, etc., a new browser tab and may present the content 111 in the new browser tab, based on one or more of the rules 122. In yet another example, the browser 111 may prevent the content 111 from being presented. The browser 111 may block the content 111 from being displayed in the browser 111, may block/prevent a new browser window from being created, may block/prevent a new browser tab from being created, etc. The browser 111 may display a message, notification, or some other indication that the content 121 was block.

In one embodiment, the browser 111 may also generate an event indicating that the request to access the content satisfies one or more rules and/or to indicate that the request to access the first content was received. For example, the browser 111 may generate an event that may be captured, received, etc., by the operating system and/or other applications of the client device 110. This may allow the operating and/or other applications to perform various actions, methods, operations, etc., when the event is received/captured. For example, an external application may perform an action (e.g., send an email, send a chat message, copy a file to a storage location, etc.) when the event is received. In another example, the event may be provided to a user (e.g., a developer, an administrator), etc., and the user may determine an appropriate action based on the event (e.g., may grant access to a file, may update permissions for a storage location, etc.).

As discussed above, the content 111 may be presented or displayed in an existing window of the browser 111, a new window of the browser 111, or a new tab of the browser 111. The browser windows or browser tabs may be optionally associated with additional rules 123. Thus browser windows or browser tabs may also be associated with the rules 122 (e.g., may also inherit the rules 122). Thus, rules 123 and rules 122 may both be applied by the browser 111 when viewing the content 121 and/or when linking to additional content (e.g., content 131) from the content 121.

In one embodiment, the rules 123 may have a higher precedence then the rules 122. For example, rules 123 may be used first to determine if one of the rules 123 matches a URI. If there are no matches, then rules 122 may be used to determine if one of the rules 122 match the URI.

The content 121 may be presented using different computer processes, based on the rules 122 (or rules 123). For example, the browser 111 may be executing in an existing computer process. A computer process may be an instance of an application/program that is being executed by one or more computing threads. For example, the browser 111 may be an application that is being executed by one or more computing threads managed by an operating system of the client device 110.

In one embodiment, the browser 111 may institute, create, etc., a new computer process for displaying the content 121. For example, the browser may instantiate a new browser window and the new browser window may execute within the new computer process.

In another embodiment, the browser 111 may use an existing computer process to display the content 121. For example, the browser 111 may create a new tab to display the content 121. The new tab may be executing with an existing computer process used to execute the browser 111.

In one embodiment, the browser 111 may initiate the execution of application 113 in response to determining that the request to access the content 121 satisfies one or more rules 122. For example, one or more actions of one or more rules 122 may indicate that the application 113 should be executed and the browser 111 may initiate execution of the application 133 based on the one or more rules 122. The application 133 may be any type of application that is separate from the browser 111 and the browser 112. For example, the application 133 may be a video conferencing application, a media player application, a word processing application, a spreadsheet application, an email application, etc.

As illustrated in FIG. 1, the server 130 includes content 131. In embodiment, the content 131 may be linked or referred to by the webpage 114 (e.g., webpage 114 may include a link to the content 131). In another embodiment, the content 131 may be linked to referred to by the content 121. For example, the content 121 may include a link, URL, etc., to the content 131. Rules 132 may be associated with the content 131 and may indicate how the content 132 should be presented, displayed, shown, etc., by the browser 111 (similar to rules 122 and content 121).

Although FIG. 1 depicts a high-level components of an illustrative example of a content delivery system 100, one skilled in the art will appreciate that other architectures for a content delivery system 100 are possible, and that the implementation of a computer system utilizing examples of the disclosure are not necessarily limited to the specific architecture depicted by FIG. 1.

Figure 2:
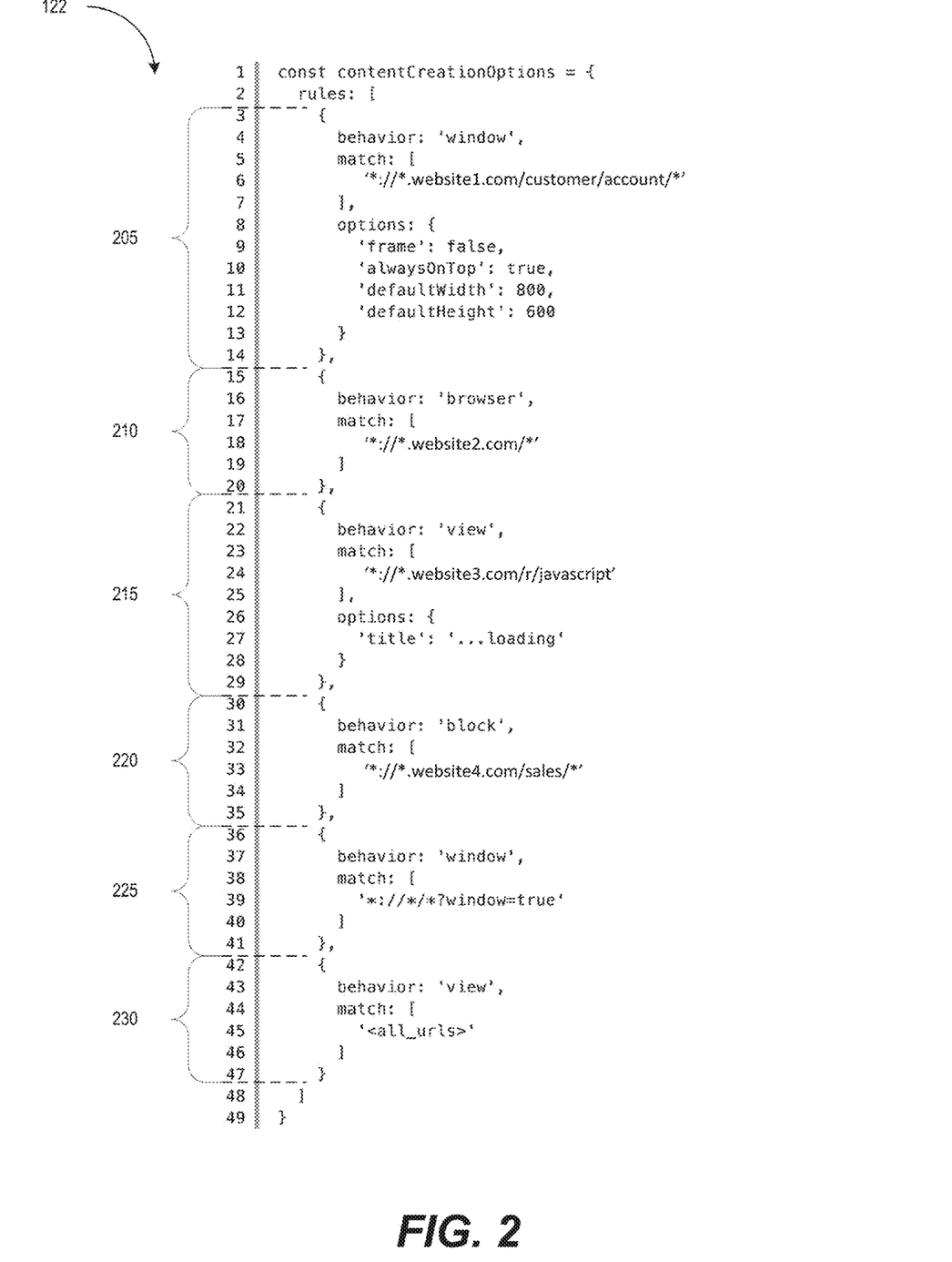
FIG. 2 is a diagram that illustrates example rules that may be used in a content delivery system, in accordance with some embodiments of the present disclosure.

FIG. 2 is a diagram that illustrates example rules 122 that may be used in a content delivery system, in accordance with some embodiments of the present disclosure. The rules 122 includes six rules, rule 205, rule 210, rule 215, rule 220, rule 225, and rule 230. The rules 122 may be a list of disparate rules that indicate how content (e.g., content 121 illustrated in FIG. 1) should be displayed or presented.

Each of the rules 205 through 230 includes a match portion or match property. The match property/portion may be used to determine whether a particular rule has been satisfied, matched, etc. The match property/portion of a rule may include resource identifiers or portions of resource identifiers. For example, the match property/portion of a rule may include portions of URLs, internet protocol (IP) address, network locations, etc. The match property/portion of a rule may include various wild cards or regular expressions. For example, the "*" character may be a wildcard that is in the match property/portion of rule 205 (e.g., at line 6 in FIG. 2). Other types of pattern or expression matching mechanisms may be used in the match property/portion in other embodiments.

In one embodiment, the list of rules 205 through 230 may be an ordered list (e.g., the rules may cascade). For example, when a request to access content is received, the URI of the content is compared with the match property/portion of each of the rules 205 through 230 in order from top to bottom. Rules 205 through 230 may be matched or applied in various ways. For example, the first rule that matches a URI may be used. In another example, all rules that match the URI may be used. Rule 230 may be a catch all rule. For example, rule 230 may be matched/satisfied if the previous rules 205 through 225 are not matched/satisfied by the URI of the content. The match property/portion of rule 230 (e.g., lines 44-46) may indicate that any URL or resource identifier may match/satisfy rule 230.

Although FIG. 2 may refer to matching URLs, URIs, or other resource identifiers, other things may be matched/satisfied for a rule. For example, instead of matching to a website, the platform may allow for matching to an executable, a file name, etc. In another example, the rule could take an action on a protocol handler, such as protocol handlers that trigger external applications such as video conferencing applications. In a further example, a rule may be satisfied or matched when content (such as a file) is downloaded. The rules may also match/identify the mechanism, application, system, etc., that triggered, initiated, etc., the loading of the content. For example, the rules may identify an executable, a file name, an application programming interface (API) call, a function, etc., that may be used to initiate loading of the content or to request the content.

Each of the rules 205 through 230 also includes a behavior portion or match property. The behavior property/portion may be used to determine what behavior, actions, operations, etc., the browser should perform when presenting/displaying the content. For example, the behavior property/ portion of rules 210 (e.g., line 16) indicates that a particular browser should be used to display any content that has "gitlab.com" in its URI.

Various types of actions (e.g., behaviors) may be indicated or specified by the behavior property/portion of a rule. One type of action is "browser" which may identify a particular browser that should be used to present/display content. For example, a client device may have multiple browsers installed on the client device (e.g., Internet Explorer®, Chrome®, Firefox®, etc.). The "browser" behavior may specify which specific browser should be used to present/display the content.

Another type of action is "window." The "window" action may indicate that a new window should be instantiated, created, etc., to present/display the content. For example, a popup window may be created to display the content when the "window" action is specified in a rule.

A further type of action is "view." The "view" action may indicate that the current browser window should be used to present/display the content. For example, the content may be displayed within a current tab or a new tab of the current browser window when the "view" action is specified in a rule (e.g., at line 22).

Yet another type of action is "block." The "block" action may indicate that the content should not be displayed or presented. For example, browser may block or prevent the content from be displayed (e.g., may prevent popups, new tabs, etc.) when the "block" action is specified in a rule (e.g., at line 31).

Although the present disclosure may refer to certain actions for a rule (e.g., window, view, block, browser), various other actions may use in other embodiments. For example, a custom action may allow a user to perform other actions, such as initiate execution of an application/executable, move or copy a file from one storage location to another storage location, change a setting in an application, etc.

Each of the rules 205 through 230 also includes an option portion or option property. The options portion/property may indicate parameters, options, configurations, etc., for the behavior of a rule. For example, lines 8-13 define options for behavior of rule 205 (e.g., the "window" behavior). The options portion/property illustrated in FIG. 2 includes four options. The first option (at line 9) is "frame" and its value is false. This indicates that the new browser window used to display the content should be frameless (e.g., should be a frameless window). The second option (at line 10) is "alwasyOnTop" and its value is true. This may indicate that the new browser window should always be on top of other windows (e.g., overlayed on top of other browser windows). The third and fourth options (at lines 11 and 12) may indicate the width and height of the new browser window.

The rules 122 allow users (e.g., developers, administrators, etc.) to specify whether content should be presented/displayed and how that content should be presented/displayed. A browser (e.g., browser 111) may include a rule engine or module that may use the rules 122 to control how content is presented/displayed by the browser. This allows users to control how content is displayed more easily, quickly, and/or efficiently.

Figure 3:
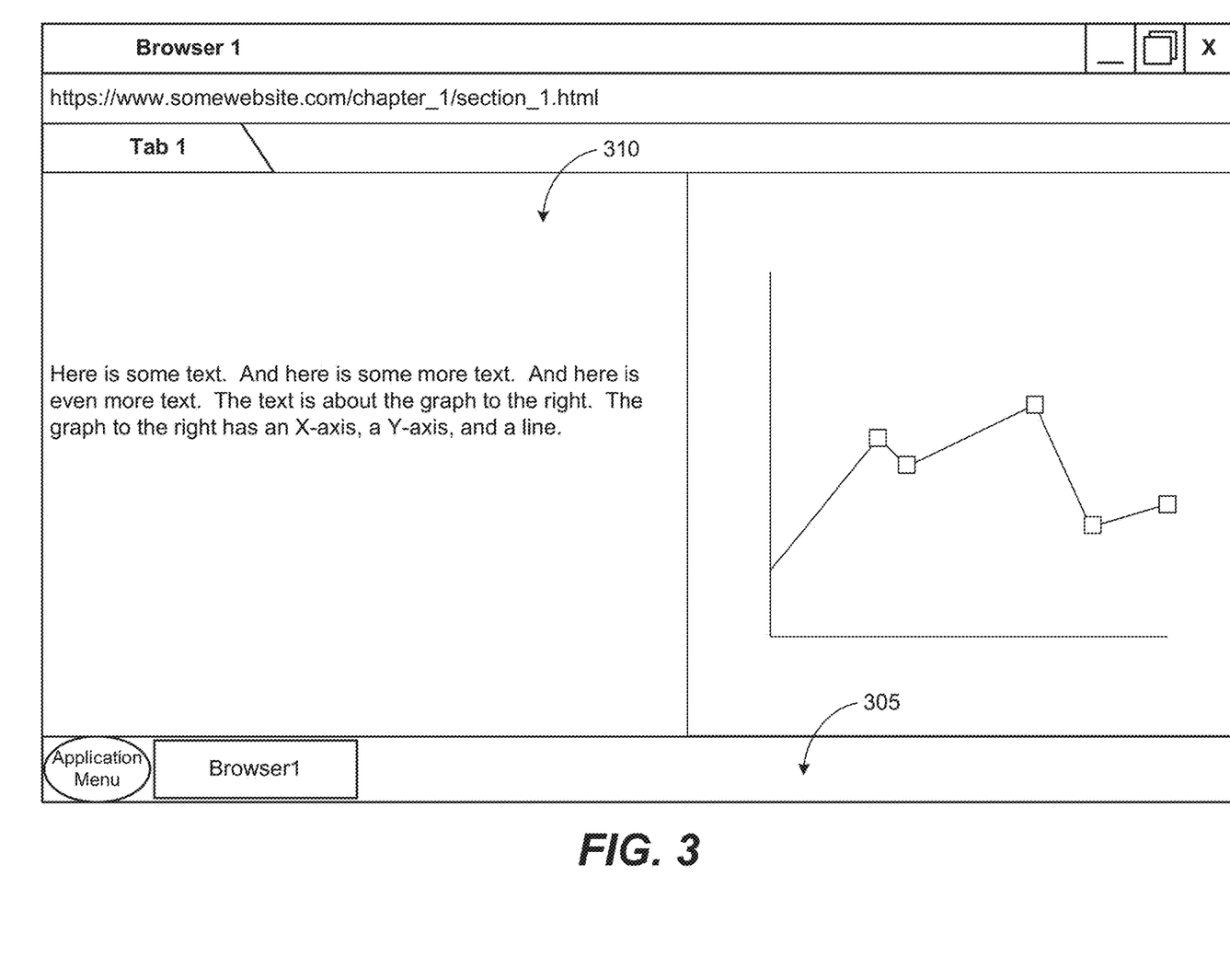
FIG. 3 is a diagram illustrating an example desktop environment, in accordance with some embodiments of the present disclosure.

FIG. 3 is a diagram illustrating an example desktop environment 300, in accordance with one embodiment. In one embodiment, a client device (e.g., a computing device, a laptop computer, a desktop computer, client device 110 illustrated in FIG. 1) may provide the desktop environment 300 for a user. The desktop environment 300 may comprise a graphical user interface with one or more icons, windows, window previews, toolbars, folders, wallpapers, shortcuts, taskbars, application menus, application groups, and/or workspaces. The desktop environment 300 may allow a user to access/manage applications, files, hardware, software, and other components of the client device using the graphical user interface. The desktop environment 300 includes a taskbar 305.

In the desktop environment 300, window Browser1 is shown on the taskbar 305. The window Browser1 may be a window for a browser (e.g., a browser window). The window Browser1 includes a tabs Tab1 (e.g., a browser tab). The window Browser1 may display, present, etc., content 310 (e.g., the text on the left half of the window Browser1 and the graph on the right half of the window Browser1), based on one or more rules, as discussed above. For example, a rule may indicate that the content 310 should be displayed within the existing tab Tab1 of window Browser1.

Figure 4:
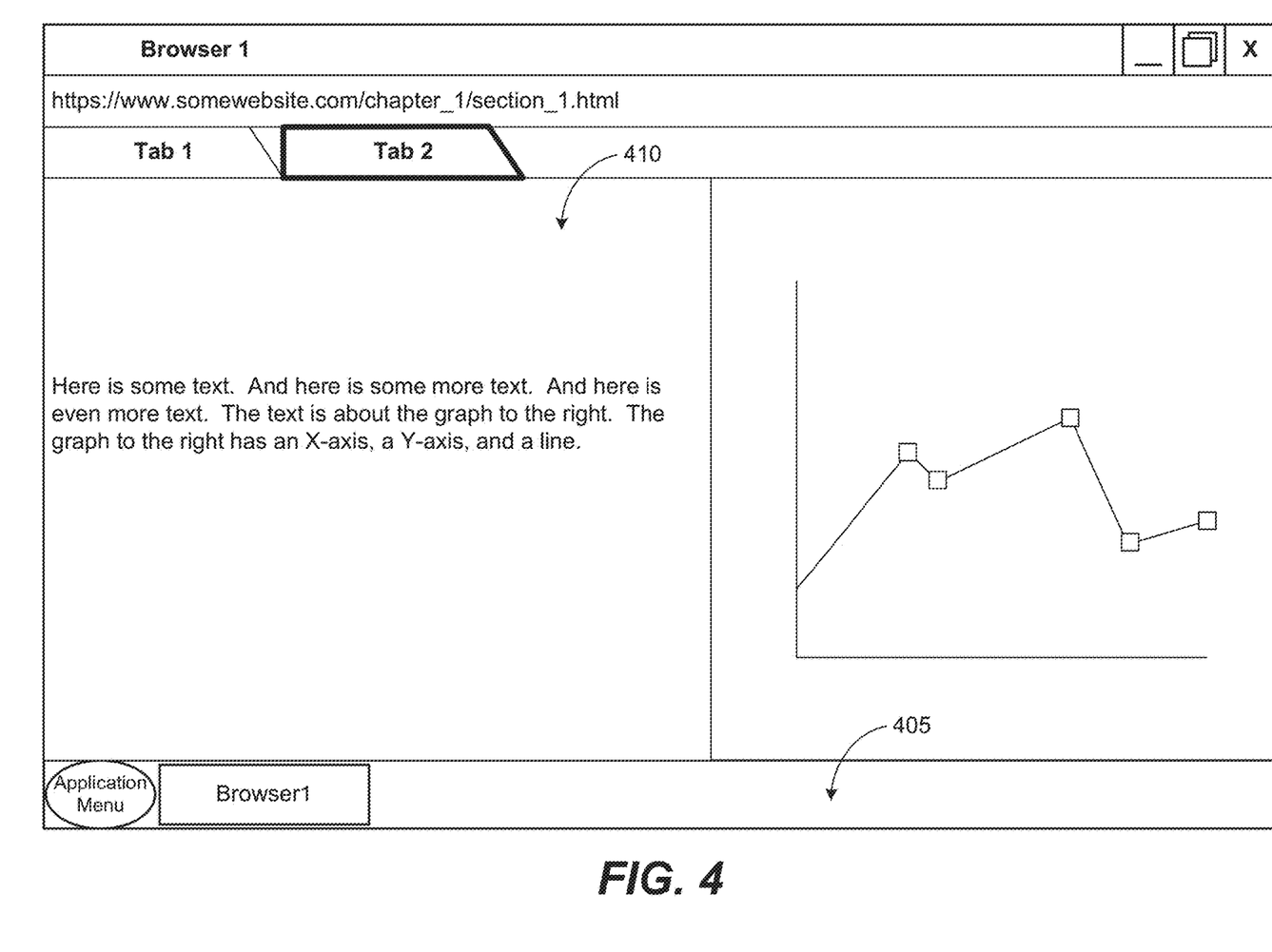
FIG. 4 is a diagram illustrating an example desktop environment, in accordance with some embodiments of the present disclosure.

FIG. 4 is a diagram illustrating an example desktop environment 400, in accordance with one embodiment. In one embodiment, a client device (e.g., a computing device, a laptop computer, a desktop computer, client device 110 illustrated in FIG. 1) may provide the desktop environment 400 for a user. The desktop environment 400 may comprise a graphical user interface that may allow a user to access/manage applications, files, hardware, software, and other components of the client device, as discussed above. The desktop environment 400 includes a taskbar 405.

In the desktop environment 400, window Browser1 is shown on the taskbar 405. The window Browser1 may be a window for a browser (e.g., a browser window). The window Browser1 includes two tabs Tab1 and Tab2 (e.g., two browser tabs). The window Browser1 may display, present, etc., content 410 (e.g., the text on the left half of the window Browser1 and the graph on the right half of the window Browser1), based on one or more rules, as discussed above. For example, a rule may indicate that the content 410 should be displayed in a new tab (e.g., Tab2).

Figure 5:
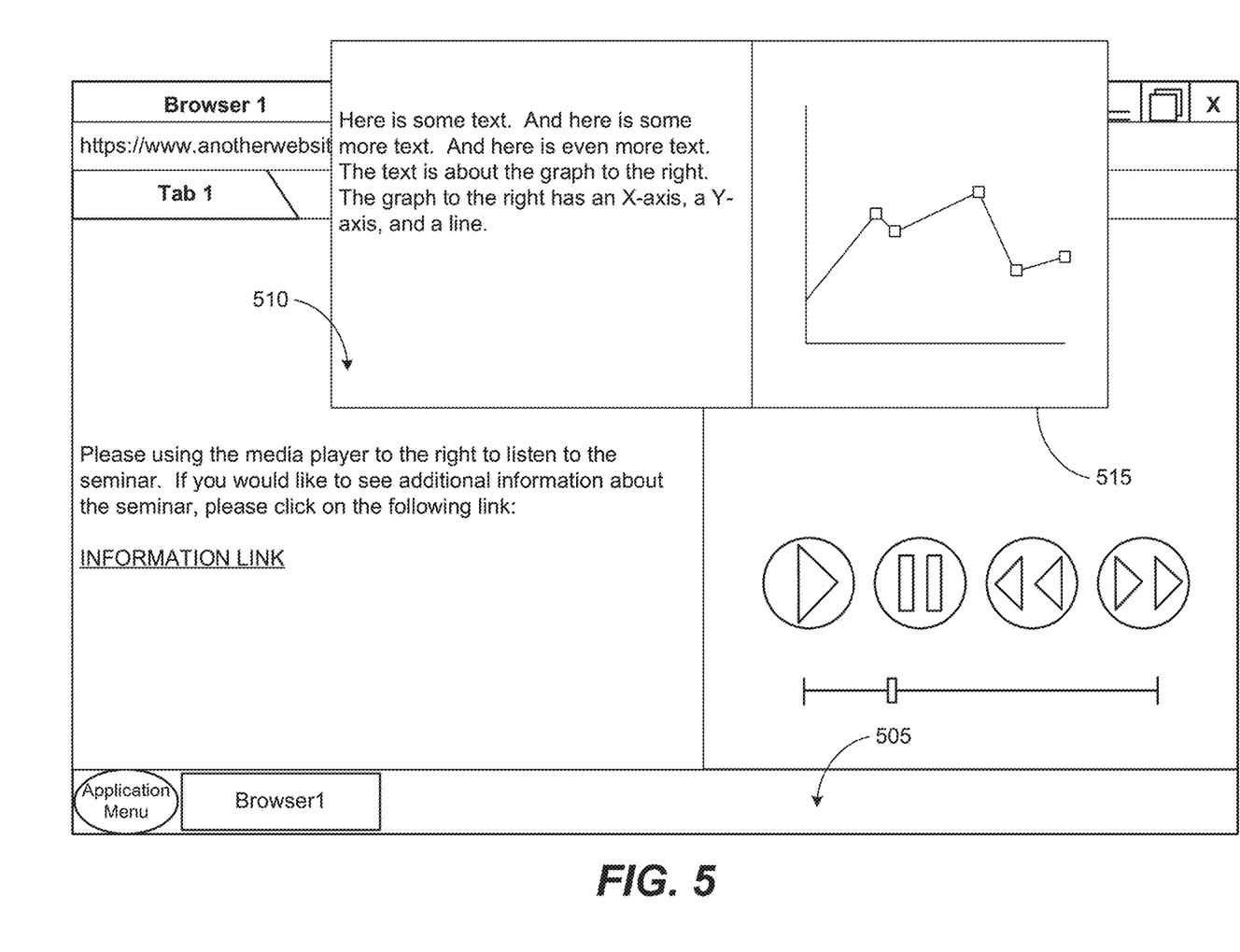
FIG. 5 is a diagram illustrating an example desktop environment, in accordance with some embodiments of the present disclosure.

FIG. 5 is a diagram illustrating an example desktop environment 500, in accordance with some embodiments of the present disclosure. In one embodiment, a client device (e.g., a computing device, a laptop computer, a desktop computer, client device 110 illustrated in FIG. 1) may provide the desktop environment 500 for a user. The desktop environment 500 may comprise a graphical user interface that may allow a user to access/manage applications, files, hardware, software, and other components of the client device, as discussed above. The desktop environment 500 includes a taskbar 505.

In the desktop environment 500, window Browser1 is shown on the taskbar 505. The window Browser1 may be a window for a browser (e.g., a browser window). The window Browser1 includes a tabs Tab1 (e.g., a browser tab). The content 510 (e.g., the text on the left half of the window Browser1 and the graph on the right half of the window Browser1), may be displayed in a new browser window 515 (e.g., a frameless window, a popup window, etc.), based on one or more rules, as discussed above. For example, a rule may indicate that the content 510 should be displayed in the new browser window 515.

Figure 6:
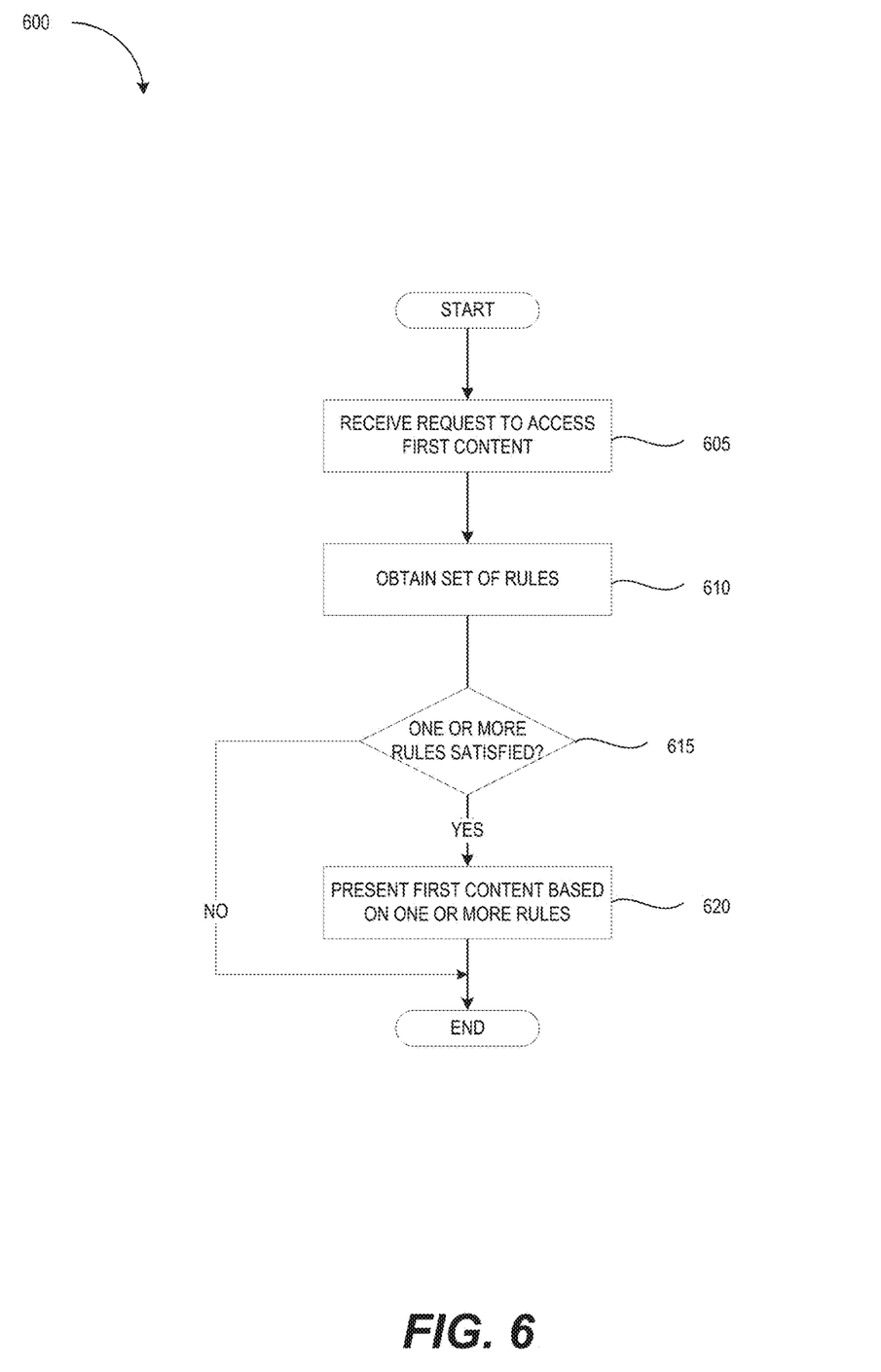
FIG. 6 is a flow diagram of a method to release display or present content, in accordance with some embodiments of the present disclosure.

FIG. 6 is a flow diagram of a method to display or present content, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof on the various described devices (e.g., client device 110 of FIG. 1). In some embodiments, at least a portion of method 600 may be performed by browser 111 (or a rule engine/module of the browser 111) of FIG. 1.

With reference to FIG. 6, method 600 illustrates example functions used by various embodiments. Although specific function blocks (e.g., operations) are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 605 where the processing logic receives a request to access a first content. For example, the processing logic may receive request to access the first content when a link or URL is clicked, activated, programmatically loaded, etc. The request may include a URI or other resource identifier for the first content. At block 610, the processing logic may obtain a set of rules for the first content. For example, the processing logic may request the set of rules from a server. In another example, the processing logic may retrieve the set of rules from a data storage device.

The processing logic may determine whether one or more or rules are satisfied at block 615. For example, the processing logic may determine whether the URI of the first content (or portions of the URI) match resource identifiers in one or more of the rules (e.g., whether the URI of the first content satisfies the match portion/property of any of the rules, as illustrated in FIG. 2). If there are no rules that are satisfied or matched, the method 600 ends. If there is at least one rule that is satisfied or matched, the processing logic presents or displays the first content based on the one or more rules at block 620. For example, the processing logic may use the first rule that is matched/satisfied, or may use multiple rules that are matched/satisfied, as discussed above. The processing logic may display/present the first content in an existing browser window, in a new browser window, or a new browser tab, based on the one or more rules. The processing logic may also block/prevent the first content from be displayed based on the one or more rules.

Figure 7:
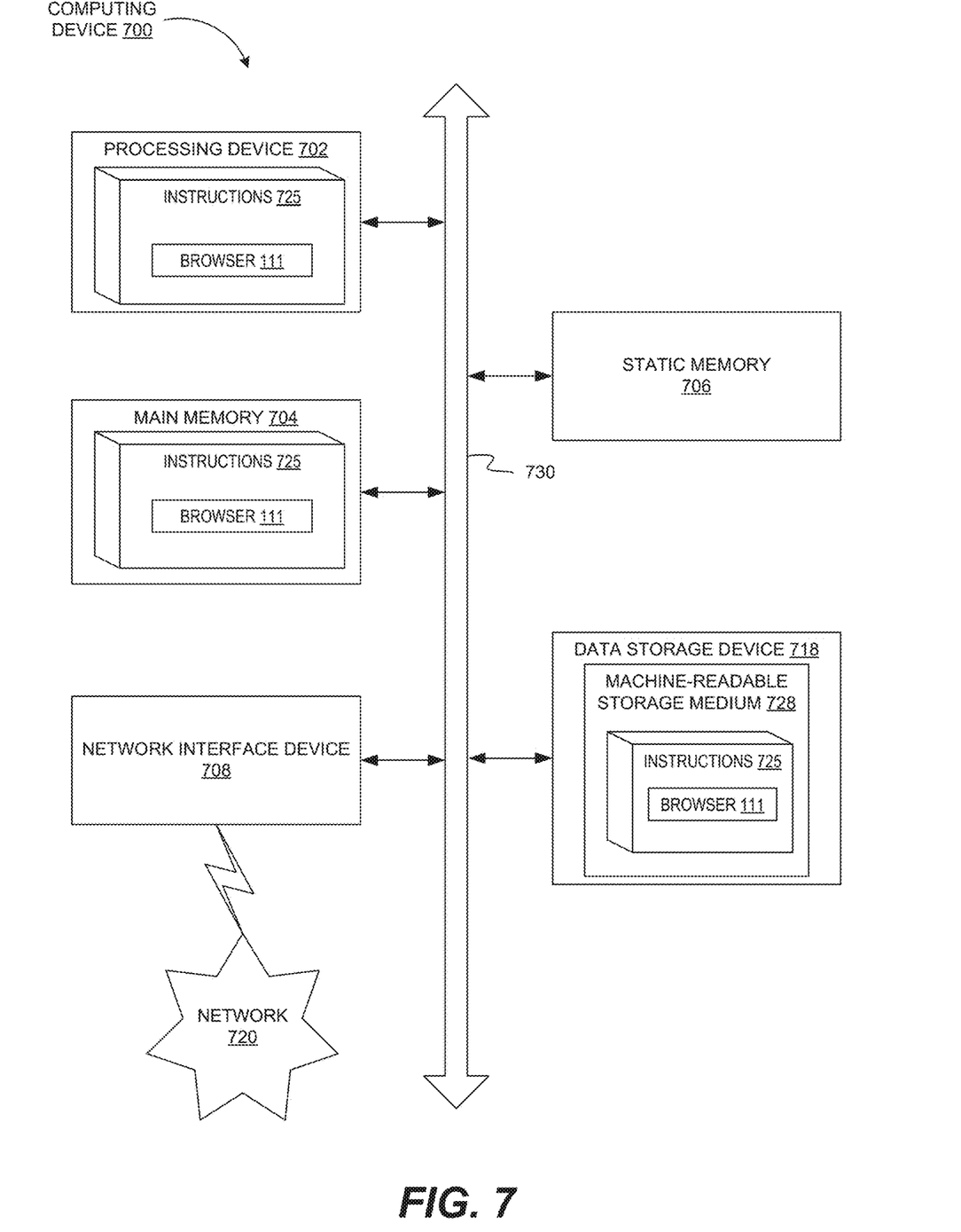
FIG. 7 is a block diagram of an example apparatus that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. Data storage device 718 may include a computer-readable storage medium 728 on which may be stored one or more sets of instructions 725 that may include instructions for a browser (e.g., browser 111 illustrated in FIG. 1), for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "reading," "routing," "updating," "connecting," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving, by a processing device via a first webpage presented by a first browser, a request to access first content stored in a computer network, wherein the request includes a uniform resource identifier of the first content, and wherein the first content is from a second location different from the first webpage;
obtaining, by the processing device, a set of rules stored in the computer network separately from the first content, wherein the set of rules includes a first rule defining a match property indicating a network location of associated content and a behavior property indicating a manner of presenting the associated content;
determining, by the processing device, whether the request to access the first content satisfies one or more rules of the set of rules based on the uniform resource identifier matching the match property indicating the network location of the first content; and
presenting, by the processing device in response to determining that the request to access the first content satisfies the one or more rules, the first content in the manner indicated by the behavior property, wherein presenting the first content comprises initiating execution of a new process, and wherein the first content is presented using the new process.

2. The method of claim 1, wherein determining whether the request to access the first content satisfies the one or more rules of the set of rules comprises:
determining whether the uniform resource identifier matches one or more resource identifiers of the set of rules.

3. The method of claim 1, wherein each rule of the set of rules comprises:
a respective match property for matching one or more resource identifiers;
a respective behavior property indicating a set of behaviors for presenting associated content; and
a respective option property for a set of options for the set of behaviors.

4. The method of claim 1, wherein presenting the first content in the manner indicated by the behavior property includes one or more of:

generating an event indicating that the request to access the first content satisfies one or more rules or that the request to access the first content was received;
presenting the first content in a second browser;
presenting the first content in a new browser window of the first browser;
presenting the first content in a new browser tab of the first browser; and
preventing the first content from being presented.

5. The method of claim 4, wherein one or more of the second browser, the new browser window, and the new browser tab are associated with the set of rules.

6. The method of claim 5, wherein one or more of the second browser, the new browser window, and the new browser tab are further associated with a second set of rules.

7. The method of claim 6, wherein the second set of rules has higher precedence than the set of rules.

8. The method of claim 1, wherein the first content is presented using an existing process.

9. The method of claim 1, further comprising:
in response to determining that the request to access the first content satisfies the one or more rules, initiating execution of an application.

10. The method of claim 1, wherein obtaining the set of rules comprises:
requesting the set of rules in response to receiving the request to access the first content.

11. The method of claim 1, wherein obtaining the set of rules comprises:
accessing the set of rules from a storage device, wherein the set of rules is received prior to the request to access the first content.

12. An apparatus, comprising:
a memory; and
a processing device, operatively coupled to the memory, to:
receive via a first webpage presented by a first browser a request to access first content stored in a computer network, wherein the request includes a uniform resource identifier of the first content, and wherein the first content is from a second location different from the first webpage;
obtain a set of rules stored in the computer network separately from the first content, wherein the set of rules includes a first rule defining a match property indicating a network location of associated content and a behavior property indicating a manner of presenting the associated content;
determine whether the request to access the first content satisfies one or more rules of the set of rules based on the uniform resource identifier matching the match property indicating the network location of the first content; and
present, in response to determining that the request to access the first content satisfies the one or more rules, the first content in the manner indicated by the behavior property, wherein presenting the first content comprises initiating execution of a new process, and wherein the first content is presented using the new process.

13. The apparatus of claim 12, wherein to determine whether the request to access the first content satisfies the one or more rules of the set of rules, the processing devices is further to:
determine whether the uniform resource identifier matches one or more resource identifiers of the set of rules.

14. The apparatus of claim 12, wherein each rule of the set of rules comprises:
a respective match property for matching one or more resource identifiers;
a respective behavior property indicating a set of behaviors for presenting the first content; and
a respective option property for a set of options for the set of behaviors.

15. The apparatus of claim 12, wherein to present the first content in the manner indicated by the behavior property includes one or more of:
generate an event indicating that the request to access the first content satisfies one or more rules or that the request to access the first content was received;
present the first content in a second browser;
present the first content in a new browser window of the first browser;
present the first content in a new browser tab of the first browser; and
prevent the first content from being presented.

16. The apparatus of claim 15, wherein one or more of the second browser, the new browser window, and the new browser tab are associated with the set of rules.

17. A non-transitory computer-readable storage medium having instructions stored thereon that, when executed by a processing device, cause the processing device to:
receive via a first webpage presented by a first browser a request to access first content stored in a computer network, wherein the request includes a uniform resource identifier of the first content, and wherein the first content is from a second location different from the first webpage;
obtain a set of rules stored in the computer network separately from the first content, wherein the set of rules includes a first rule defining a match property indicating a network location of associated content and a behavior property indicating a manner of presenting the associated content;
determine whether the request to access the first content satisfies one or more rules of the set of rules based on the uniform resource identifier matching the match property indicating the network location of the first content; and
present, in response to determining that the request to access the first content satisfies the one or more rules, the first content in the manner indicated by the behavior property, wherein presenting the first content comprises initiating execution of a new process, and wherein the first content is presented using the new process.

* * * * *